Sept. 15, 1942.  C. P. GILLESPIE  2,295,897
GOVERNOR
Filed May 17, 1941

Charles P. Gillespie.
INVENTOR.

BY J. Vincent Martin
and Ralph R. Browning
ATTORNEYS

Patented Sept. 15, 1942

2,295,897

UNITED STATES PATENT OFFICE 2,295,897

GOVERNOR

Charles P. Gillespie, Houston, Tex., assignor of one-fourth to J. R. Turnbull, one-eighth to J. C. Vann, and one-thirty-second to W. P. Haley, all of Houston, Tex.

Application May 17, 1941, Serial No. 393,912

3 Claims. (Cl. 74—526)

This invention relates to governors and has for its general object the provision of a means for predetermining the maximum sustained speed of a motor, particularly for vehicles or the like, but not excluding motors for other purposes.

More specifically it is the object of this invention to provide a means whereby a maximum speed for a motor or the like may be predetermined, yet which will permit an operator to cause a motor controlled by such a device to exceed such speed in the event the occasion demands.

Another object is to provide a device of the type just referred to which will automatically reset itself after the speed for which it has been set has been exceeded.

Another object of this invention is to provide a means for setting a predetermined maximum speed for a motor or the like and for adjusting such maximum speed within limits.

Another object is to provide a means as just referred to by which the upper limit to which the maximum speed may be adjusted may be predetermined, set and reset, and sealed in any position desired.

Other objects and advantages of this invention will become apparent from the following description taken with the accompanying drawing in which is set forth by way of illustration one embodiment of this invention.

Figure 1:
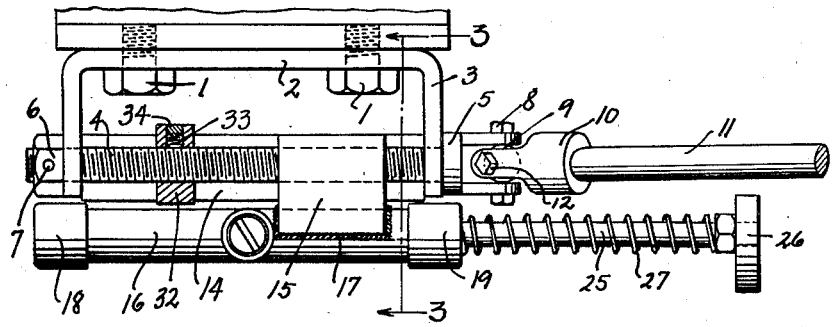
Fig. 1 is a top plan view of a device constructed in accordance with this invention, parts being broken away and shown in cross section for purposes of illustration.

The device of this invention may be bolted or otherwise secured to the side of the motor or to any other suitable support. It is shown in Fig. 1 as being so secured by means of cap screws 1 which pass through the flat intermediate portion of a U-shaped bracket 2 having horizontally extending arms 3.

Rotatably mounted in bearings adjacent the outer ends of the arms 3 is a shaft having screw threads 4 substantially throughout its entire length. This shaft preferably terminates at one end in a bifurcated fitting 5 which has a shoulder abutting against the adjacent arm 3 to limit the movement of the screw in one direction, and at its opposite end a nut 6 is pinned or otherwise nonrotatably secured to the end of the screw as shown at 7. The screw shaft 4 is thus mounted so that it may rotate but may not move longitudinally in either direction.

The bifurcated fitting 5 is adapted to receive a bolt 8 which serves to secure between the spaced extremities of the fitting a ball 9 or other similar universal joint element. A second fitting 10, similar to the fitting 9, is secured to the lower end of an adjusting shaft 11 and is likewise provided with a bolt 12 by which it is secured to the same element 9 of the universal joint. The shaft 11 is adapted to extend upwardly through the dash and cowl boards to a position on the outside of the cowl board or to any other convenient position where it may be reached by an operator, and is provided with a knob 13 on its upper end whereby it may be rotated. It will readily be seen that rotation of the knob 13 will cause rotation of the screw shaft 4 without any longitudinal movement thereof.

Extending between the arms 3 in a position offset from the screw shaft 4 but parallel thereto is a guide bar 14. A nut 15 interiorly threaded to receive the screw shaft 4 is mounted on the screw shaft between the arms 3 and is adapted to be held against rotation by contact with the guide bar 14. It will readily be seen that rotation of the shaft 11 by means of the knob 13 will cause rotation of the screw 4 and the consequent movement of the nut 15 from one end of the screw toward the other depending upon the direction of rotation.

Figure 2:
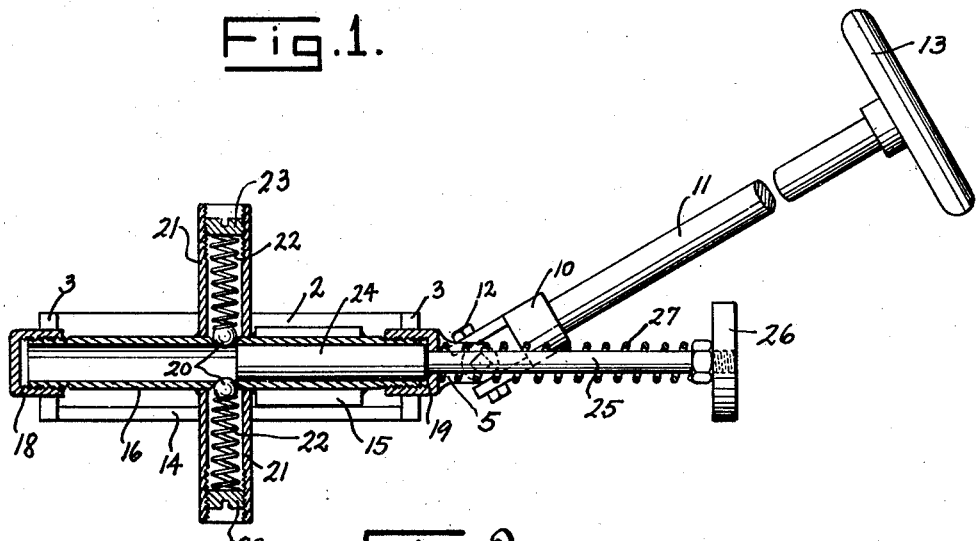
Fig. 2 is a view partly in side elevation and partly in longitudinal cross section illustrating the device shown in Fig. 1 with the addition of the knob for adjusting the same.
Figure 3:
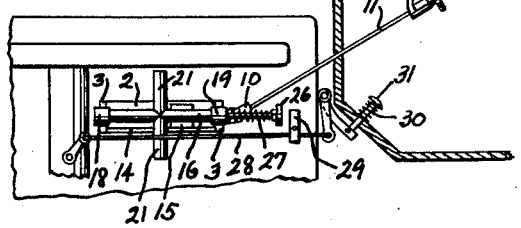
Fig. 3 is a transverse cross section through the device shown in Fig. 1 taken along the line 3—3 thereof.
Figure 4:
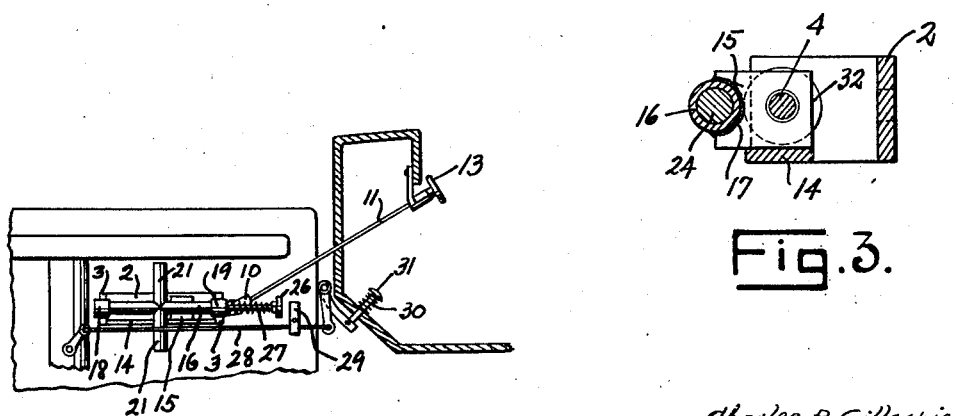
Fig. 4 is a view on a reduced scale showing the device as applied to the motor or a motor vehicle, the dash and cowl boards of the vehicle being shown in vertical cross section.

The nut 15 serves as a bracket for the support of a cylindrical member 16, the details of which are illustrated in Fig. 2. This cylindrical member 16 is preferably welded or otherwise suitably secured to the nut 15 as shown at 17 and is closed at one end by means of a cap and at the other end by means of a perforated cap 19. Intermediate its ends the cylinder 16 is provided with one or more openings through its side wall adapted to receive balls 20. These openings are of such size that the balls may partially project into the interior of the cylinder but may not pass completely into the cylinder. Surrounding each of the openings just referred to are other cylindrical members which serve merely as retainers for springs 22 which press the balls 20 into their respective openings. The outer ends of the springs 22 bear against a plug 23 within each of the cylinders 21.

Within the cylinder 16 is a plunger 24 which is of a diameter to substantially fill the cylinder 16 but move freely therein and which is shorter than the cylinder 16 by an amount such as will permit sufficient movement for the individual circumstances of each case where it is to be installed.

Carried by the plunger 24 and projecting through the perforated cap 19 is a stem 25 having a head 26 mounted thereon on its outer end and having a spring 27 between said head and the perforated cap 19 to constantly urge this rod to the plunger 24 to the right, as seen in Fig. 2.

The device just referred to is mounted adjacent a longitudinally movable portion of the accelerator or throttle linkage of the motor which is to be controlled. On such portion 28 of the throttle linkage is mounted a stop 29 so positioned that when the throttle is opened this stop 29 will after moving a predetermined distance engage the stop 26.

In operation the knob 13 will be rotated to set the nut 15 and the apparatus carried thereby in a position corresponding to the maximum speed at which it is desired for the motor to operate. When the throttle is opened to a position corresponding to such speed the stop 29 will be positioned to engage the stop 26. Thereupon further opening movement of the throttle will be resisted not only by any spring which may be present in the throttle mechanism, such as for example the spring 30 under the accelerator 31, but also by the spring 27 which may be made of any strength desired. By this means the operator will be informed that he has opened the throttle to the maximum amount which should give him the desired maximum speed. The spring 27 may be made of such strength and may be given such initial compression that a large amount of effort may be required to compress it. However, it should not be made of such strength or provided with such tension that it cannot be overcome by the operator in case of necessity. With this mechanism if the necessity arises the operator may push harder on the throttle forcing the plunger 24 between the balls 20 and compressing the spring 27. By this means the motor may be run with the throttle as wide open as is necessary. However, if the spring 27 is of sufficient strength, it will be very difficult for an operator to hold the throttle in such open position. The device will thus serve to effectively regulate the maximum speed at which the motor will be operated, without, however, preventing the operator from increasing his speed temporarily beyond such maximum speed in the event he finds the same to be necessary.

It is further apparent that the maximum speed may be readily adjusted by the operator by means of the knob 13 so that if the device is employed on a motor vehicle he may adjust his speed to the maximum speed limit for various localities and zones in which he may drive.

On occasions it may be found desirable to fix a motor vehicle or the like so that the maximum speed for which the devices of this invention may be set will be limited. Thus, in the case of a commercial vehicle driven by an employee both in city and country driving it might be desirable to prevent the setting of the governing device of this invention for a maximum speed greater than fifty miles per hour, while at the same time leaving the device free for the operator to adjust it to any maximum speed less than fifty miles an hour. For this purpose there is provided and illustrated in Fig. 1 a collar 32 which may or may not be threaded internally but which may be fixed in any desired position on the screw shaft 4 by means of a set screw 33. After it has been so fixed, its adjustment may be sealed by means of a seal 34 of lead or the like, the same being filled in behind the set screw 33. With the collar 32 so fixed on the screw shaft 4 it will be seen that the nut 15 cannot be moved forwardly on the screw 4 more than a predetermined distance and this position of the collar 32 will thus serve to limit the maximum speed for which the device may be set. Even in that instance, however, the operator may on occasion speed up the motor by forcibly moving the throttle against the tension of the spring 27.

Having described my invention, I claim:

1. In a device of the character described, a stop adapted to be engaged by a throttle mechanism when the throttle mechanism has been moved toward open position a predetermined amount, yieldable support means for said stop whereby the exertion of excessive effort upon said throttle will cause movement of said stop and permit additional opening movement of said throttle and means for resisting initial movement of said stop and releasable upon such initial movement to permit substantially free movement of said stop beyond such initial movement.

2. In a governing mechanism, a stop adapted to be engaged by a portion of a motor throttle, a resilient support for said stop whereby said stop will be supported so that it may be moved from its normal position by an excessive force applied thereto, and additional yieldable latching means for initially resisting any force tending to move said stop until movement of said stop has actually begun and thereupon releasable to provide substantially no interference with subsequent movement of said stop.

3. In a motor vehicle governor, a bracket adapted to be mounted fixedly on a portion of the vehicle adjacent the throttle mechanism thereof, an externally threaded shaft rotatably mounted on said bracket, means for preventing said shaft from moving longitudinally, a nut threadedly engaging said shaft, means for preventing rotation of said nut, whereby rotation of said shaft will cause longitudinal movement of said nut, a guide carried by said nut and extending in a direction substantially parallel to said shaft, a slide carried by said guide, a stop on said slide, spring means normally urging said slide toward one extreme position in said guide, and yieldable latching means for normally holding said slide in such extreme position, said stop on said slide being in the path of a portion of the throttle mechanism of said vehicle as said throttle mechanism is moved toward open position.

CHARLES P. GILLESPIE.